United States Patent [19]
Krambeck

[11] Patent Number: 5,211,423
[45] Date of Patent: May 18, 1993

[54] VEHICLE SEAT BELT TENSIONING MECHANISM

[75] Inventor: Dagoberto Krambeck, Sterling Heights, Mich.

[73] Assignee: General Safety Corporation, St. Clair Shores, Mich.

[21] Appl. No.: 822,403

[22] Filed: Jan. 17, 1992

[51] Int. Cl.⁵ .............................................. B60R 22/18
[52] U.S. Cl. ..................................... 280/806; 280/807
[58] Field of Search ............... 280/801, 802, 805, 806, 280/807

[56] References Cited

U.S. PATENT DOCUMENTS

| | | | |
|---|---|---|---|
| 4,913,997 | 4/1990 | Knabel et al. | 280/806 |
| 4,917,210 | 4/1990 | Danicek et al. | 280/806 |
| 4,999,004 | 3/1991 | Skanberg et al. | 280/806 |
| 5,039,127 | 8/1991 | Fohl | 280/800 |

Primary Examiner—Kenneth R. Rice
Attorney, Agent, or Firm—Harness, Dickey & Pierce

[57] ABSTRACT

A vehicle-sensitive belt tensioning mechanism provided for taking up slack in a seat belt in response to a high deceleration condition for restraining the seat occupant against forward excursion. The belt tensioning mechanism includes an inertial sensing device for detecting the deceleration forces, a pre-loaded drive mechanism for rotatably driving a reel member, a coupling device interconnecting the belt buckle and the reel member, a triggering linkage for actuating the pre-loaded drive mechanism, and a locking device for maintaining tension on the seat belt. Following actuation of the drive mechanism, the coupling device is wound onto the reel member for effectively retracting the belt buckle from its normal location.

17 Claims, 4 Drawing Sheets

VEHICLE SEAT BELT TENSIONING MECHANISM

BACKGROUND AND SUMMARY OF THE INVENTION

The present invention relates generally to a seat belt tensioning mechanism for motor vehicles and, more particularly, to a vehicle-sensitive seat belt tensioning mechanism operable to automatically retract the seat belt buckle for tensioning the seat belt against the seat occupant in response to the vehicle being subjected to a deceleration force exceeding a predetermined critical value.

Modernly, virtually all motor vehicles are equipped with some type of passenger restraint system for physically restraining the seat occupant when the vehicle is subjected to high rates of deceleration which may occur, for example, during heavy braking or a collision. As is known, the most common type of passenger restraint system is a seat belt system having at least one of a lap belt and a shoulder belt, or a combination thereof, that can be withdrawn from a retractor device for latched engagement with an anchored buckle member. Typically, the retractor device includes a locking mechanisms for inhibiting withdrawal of the seat belt when the vehicle is subjected to deceleration forces exceeding the predetermined critical level, thereby restraining the vehicle occupant.

One type of seat belt retractor, commonly referred to as an "emergency locking retractor" (ELR), permits the seat belt to be freely withdrawn from the retractor in response to movement of the seat occupant during normal operating circumstances, thereby providing increased comfort and freedom of movement for the seat occupant. In addition, many seat belt retractors are also frequently equipped with a tension relief device or so-called "comfort" mechanism which prevents the retractor from constantly exerting a tensioning force on the belt webbing which tends to be uncomfortable and annoying to the seat occupant. Typically, the "slack" generated by the comfort mechanism can be cancelled by withdrawing a relatively short length of the belt from the retractor.

While seat belt retractors generally perform satisfactorily, the existence of an excessive amount of "slack" in the seat belt (i.e., such as when the seat occupant is sitting forward in the seat) may permit the seat occupant to be thrown forward and collide with onboard structures during the occurrence of such a deceleration force being exerted on the vehicle. To prevent such secondary impacts, the protection which is afforded by conventional seat belt systems can be further enhanced by the use of a belt tensioning mechanism. In general, belt tensioning mechanisms function to remove slack from the seat belt immediately after occurrence of the deceleration force such that the seat occupant is physically restrained within the seat before being thrown forward due to the inertia of the collision.

Conventional seat belt tensioning mechanisms are typically incorporated into the seat belt retractor and operate to retract the seat belt into the retractor upon detection of the deceleration forces. Alternatively, it is also known to use a separate tensioning mechanism which is operably coupled to the buckle member for causing retractive movement of the buckle member such that existing "slack" in the seat belt is removed. In either case, most commercially available belt tensioning mechanisms are complex mechanical or electromechanical systems which are generally quite expensive and difficult to install. Furthermore, some belt tensioning mechanisms are sub-assemblies of the seat and therefore are considered to be "seat-sensitive" systems (i.e., function to detect movements of the seat).

In view of the foregoing, a need exists to provide an improved belt tensioning mechanism having a substantially simplified structure and operation. In this regard, the belt tensioning mechanism of the present invention is constructed and arranged to minimize the number and complexity of mechanical parts, decrease the reaction time required to sense the deceleration and tighten the seat belt, while increasing the overall effectiveness of the seat belt restraint system.

It is therefore an object of the present invention to provide a mechanical "buckle-type" belt tensioning mechanism that is responsive to vehicle deceleration levels above a predetermined critical value for retracting the buckle member so as to apply a "tensioning" load on the seat belt for minimizing forward excursions of the seat occupant.

It is a further object of the present invention to provide a mechanical "buckle-type" belt tensioning mechanism having a unique triggering arrangement for actuating a pre-loaded drive mechanism in response to detection of the deceleration forces. According to the present invention, the above objects are accomplished by providing a "vehicle-sensitive" belt tensioning mechanism having inertia sensing means for sensing the magnitude of a vehicle deceleration, a pre-loaded drive mechanism operable for rotatably driving a reel member, coupling means for coupling the buckle member to the reel member, triggering means for actuating the drive mechanism in response to the inertia sensing means, and locking means for lockingly retaining the belt buckle member in a retracted condition following actuation of the drive mechanism.

Additional benefits and advantages of the present invention will become apparent to those skilled in the art to which this invention relates from the subsequent description of the preferred embodiment and appended claims, taken in conjunction with the accompanying drawings.

DETAILED DESCRIPTION OF THE INVENTION

Figures 1, 3:
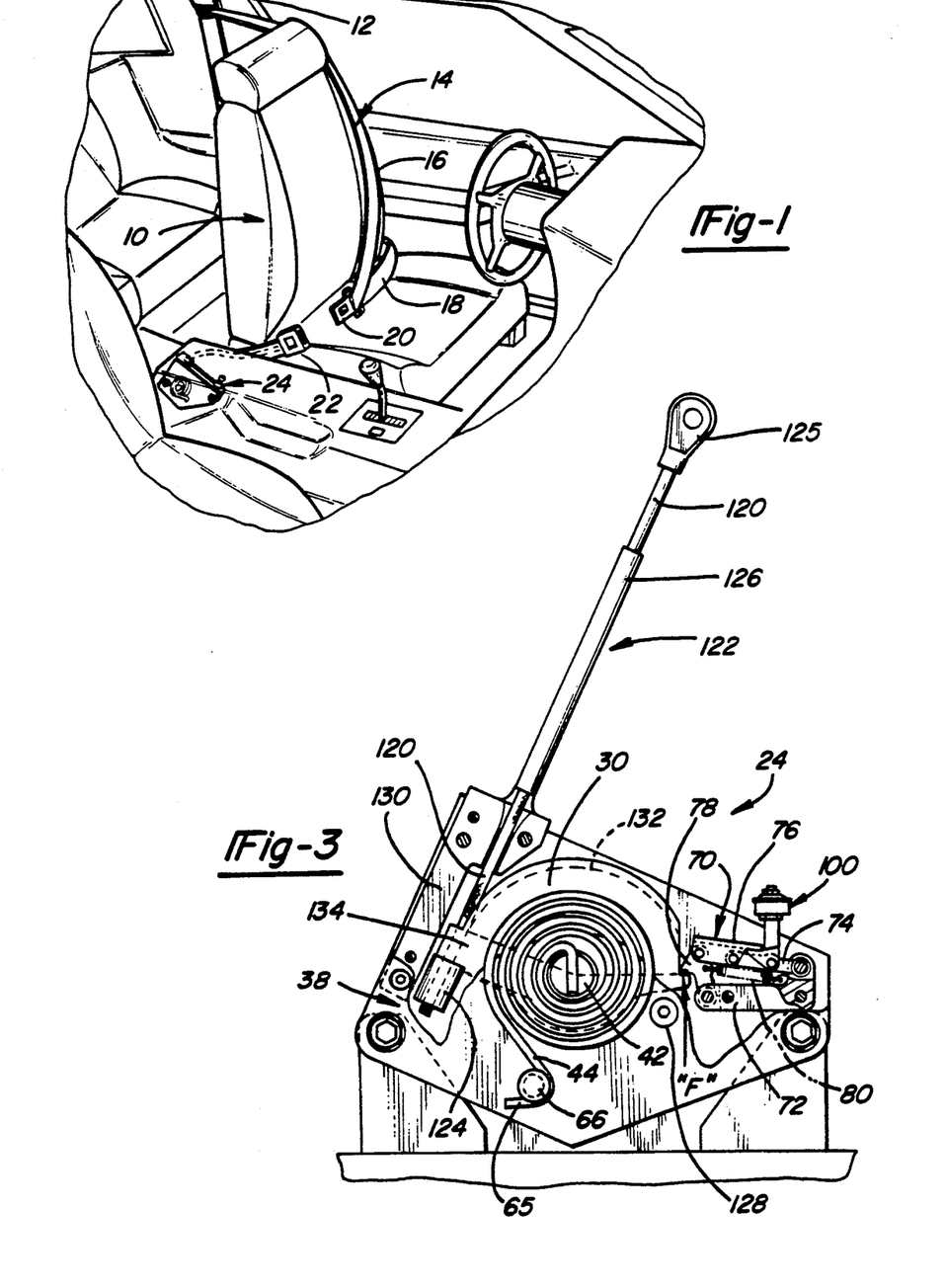
FIG. 1 is a partial interior view of an exemplary motor vehicle showing a seat belt restraint system and the belt tensioning mechanism of the present invention.
FIG. 3 is a partially cut-away side view illustrating the belt tensioning mechanism in a normally "non-actuated" pre-loaded position.

With reference to FIG. 1, a portion of the interior of an exemplary motor vehicle is shown to include a seat 10 and a seat belt restraint system having retractor assembly 12 mounted on a vertical pillar of the motor vehicle in a conventional manner. A safety or "seat" belt 14 includes a shoulder belt 16 shown projecting from retractor assembly 12 and a lap belt 18. Shoulder belt 16 is adapted to extend over the shoulder and across the chest of the seat occupant. A tongue or "latch" plate 20 is retained on shoulder belt 16 and lap belt 18 for fastening to a buckle member 22 in a conventional manner. As is known in the art, a separate retractor assembly (not shown) may be provided for lap belt 18 of the restraint system.

With continued reference to FIG. 1, a belt tensioning mechanism 24 is shown located on the buckle side of the seat 10 and is rigidly mounted to the floor (or other structural portion) of the vehicle. In general, belt tensioning mechanism 24 is provided to enhance the protection afforded to the seat occupant by the seat belt restraint system. More specifically, belt tensioning mechanism 24 is operable to retract buckle member 22 from the normal position shown in response to the vehicle being subjected to a deceleration force which exceed a predetermined critical value (i.e., such as during heavy braking or immediately after a vehicle collision).

In accordance with a preferred embodiment of the present invention, belt tensioning mechanism 24 is a "vehicle-sensitive" device which facilitates the removal of "slack" in seat belt 14 for exerting a "tensioning" load on the seat occupant which acts to physically restrain the seat occupant in seat 10. Moreover, belt tensioning mechanism 24 is designed to effectively "tighten" seat belt 14 before the inertial forces acting on the seat occupant can pull out the "slack" in seat belt 14. In this manner, forward excursions of the seat occupant within the interior of the motor vehicle are significantly minimized. While shown with a combination seat belt 14, it will be appreciated that belt tensioning mechanism 24 can be used in virtually any seat belt restraint system having at least one of a lap belt 18 and a shoulder belt 16 installed within the passenger compartment of the motor vehicle.

Figure 2:
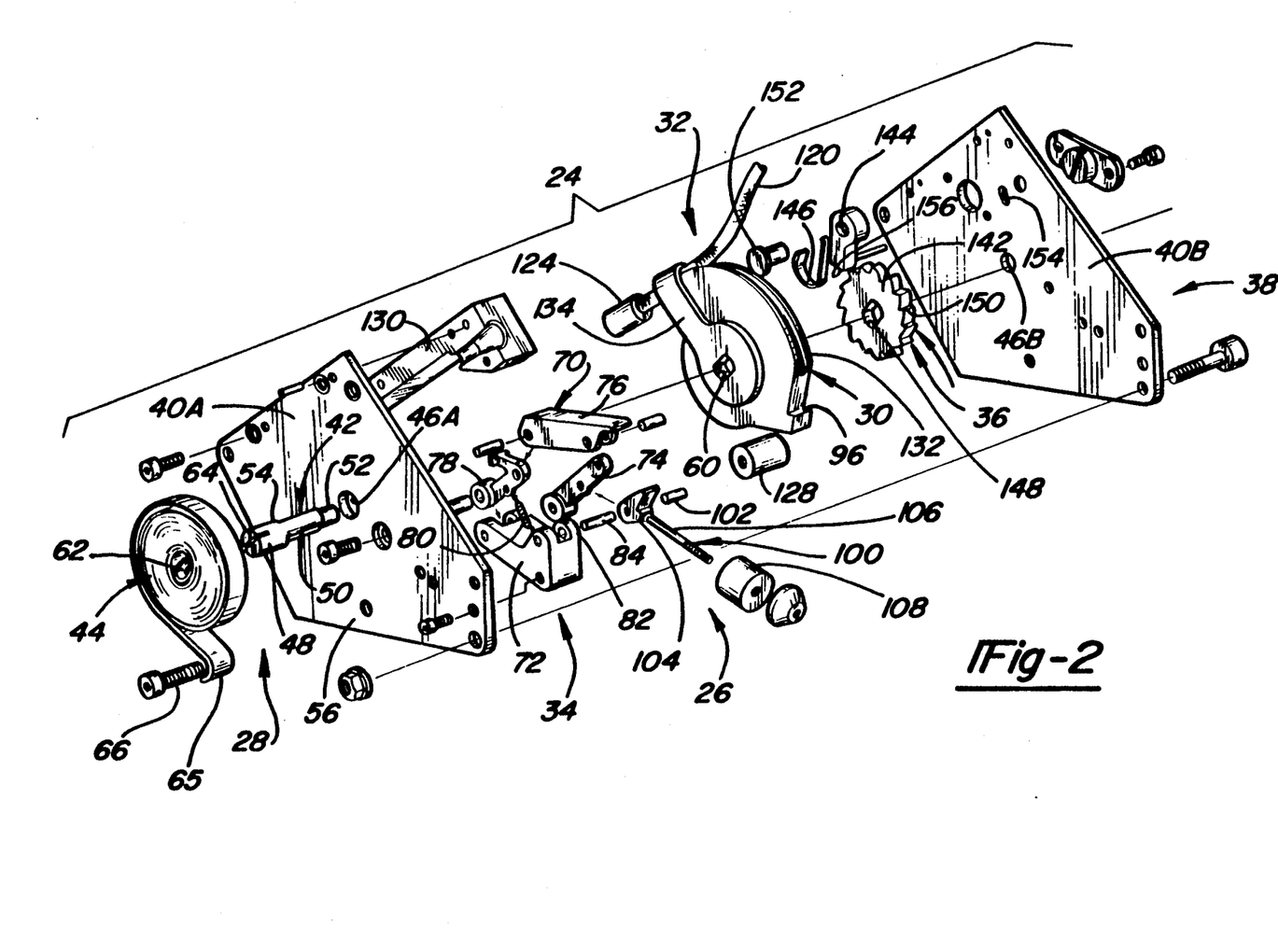
FIG. 2 is an exploded view of the belt tensioning mechanism shown in FIG. 1 constructed according to a preferred embodiment of the present invention.

With particular reference to FIG. 2, an exploded perspective view of belt tensioning mechanism 24 is shown. In general, belt tensioning mechanism 24 is a mechanical "buckle-type" device having a unique "triggering" arrangement for actuating a mechanical drive mechanism in response to detection of the deceleration forces. According to a preferred construction, belt tensioning mechanism 24 includes inertia sensing means 26 operable for sensing the magnitude of the deceleration force exerted on the motor vehicle, drive means 28 operable for rotatably driving a reel member 30 between a "locked" position and a "released" position, coupling means 32 for coupling buckle member 22 to driven reel member 30, triggering means 34 for actuating drive means 28 in response to inertia sensing means 26 detecting a deceleration force exceeding the predetermined critical value, and locking means 36 operable for retaining buckle member 22 in a retracted condition following actuation of drive means 28. Each of the afore-noted mechanisms or devices are operably supported and/or retained within a housing assembly 38 that is rigidly mounted within the passenger compartment of the motor vehicle. As such, inertia sensing means 26 is operable to sense and respond to vehicle decelerations and not to movement of seat 10.

With continued reference to FIG. 2, housing assembly 38 is shown to include a pair of laterally spaced side plates 40A and 40B. Drive means 28 is operably supported between side plates 40A and 40B and includes a drive rod 42 and a pre-loaded spring member 44. Drive rod 42 projects through and is supported for rotation within a pair of aligned apertures 46A and 46B formed in side plates 40A and 40B, respectively. Drive rod 42 has an enlarged cylindrical end portion 48, a central portion 50 having a generally rectangular cross-section and a reduced cylindrical end portion 52. Upon installation of drive rod 42 into housing assembly 38, a shoulder 54 formed between enlarged end portion 48 and the parallel side surfaces of center portion 50 is adjacent an outer planar surface 56 of side plate 40A. Reel member 30 is supported from drive rod central portion 50 such that rotation of drive rod 42 causes corresponding rotation of reel member 30. More particularly, reel member 30 has a generally rectangular aperture 60 sized to permit the rectangular central portion 50 of drive rod 42 to project therethrough. In addition, reduced cylindrical end 52 of drive rod 42 extends through aperture 46B in side plate 40B. Thereafter, a keeper or lock pin (not shown) is installed through an axial bore (not shown) formed in drive rod 42 for effectively retaining drive rod 42 for rotation within housing assembly 38.

In accordance with the preferred embodiment, preloaded spring member 44 is a flat circular rewind spring having a first end 62 retained within a slot 64 formed in enlarged cylindrical end 48 of drive rod 42. The second end 65 of rewind spring 44 has a bent over portion wrapped over a stop pin 66 extending outwardly from side plate 40A. Rewind spring 44 is operable to transfer a relatively large biasing force to drive rod 42 for rotatably driving reel member 30 between the "locked" position when belt tensioning mechanism 24 is "non-actuated" (FIG. 3) and the "released" position (FIG. 4) when belt tensioning mechanism 24 is "actuated". An advantage associated with use of rewind spring 44 is that it will maintain a greater percentage of its pre-loaded force over an extended time period compared to conventional pre-loaded biasing devices (i.e., helical compression springs). This is important since it is possible for belt tensioning mechanism 24 to be maintained in its "non-actuated" condition for many years before ever being triggered.

In the "non-actuated" condition, the biasing force of rewind spring 44 is effectively "pre-loaded" to cause immediate rotation of reel member 30 upon its release. As will be described hereinafter in greater detail, triggering means 34 is an over-center toggle linkage 70 operable for normally retaining reel member 30 in the "locked" position, in opposition to the large pre-loaded biasing force exerted thereon by rewind spring 44, when belt tensioning mechanism 24 is in its "non-actuated" condition. In addition, toggle linkage 70 is also operable to actuate belt tensioning mechanism 24 in response to inertia sensing means 26 detecting a deceleration level exceeding the predetermined critical value.

Figure 5:
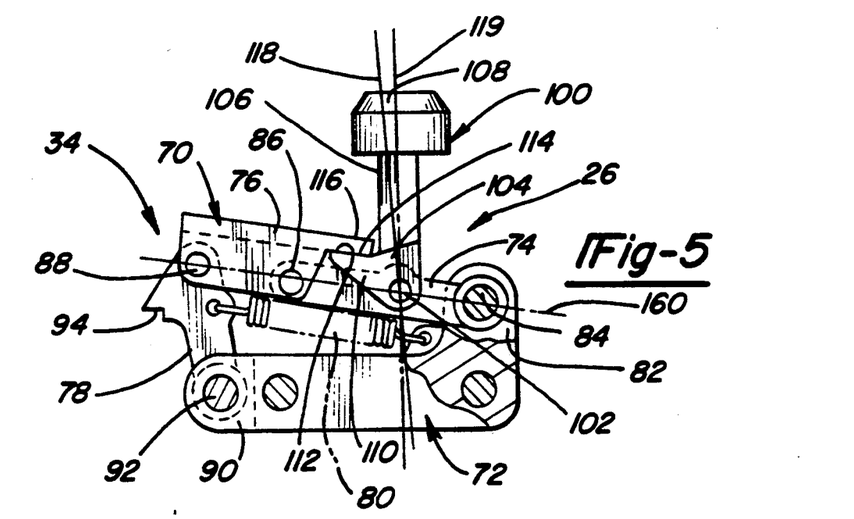
FIG. 5 is a side view illustrating the functional association of the inertia force sensor and the over-center triggering linkage of the belt tensioning mechanism in the "non-actuated" position.
Figure 6:
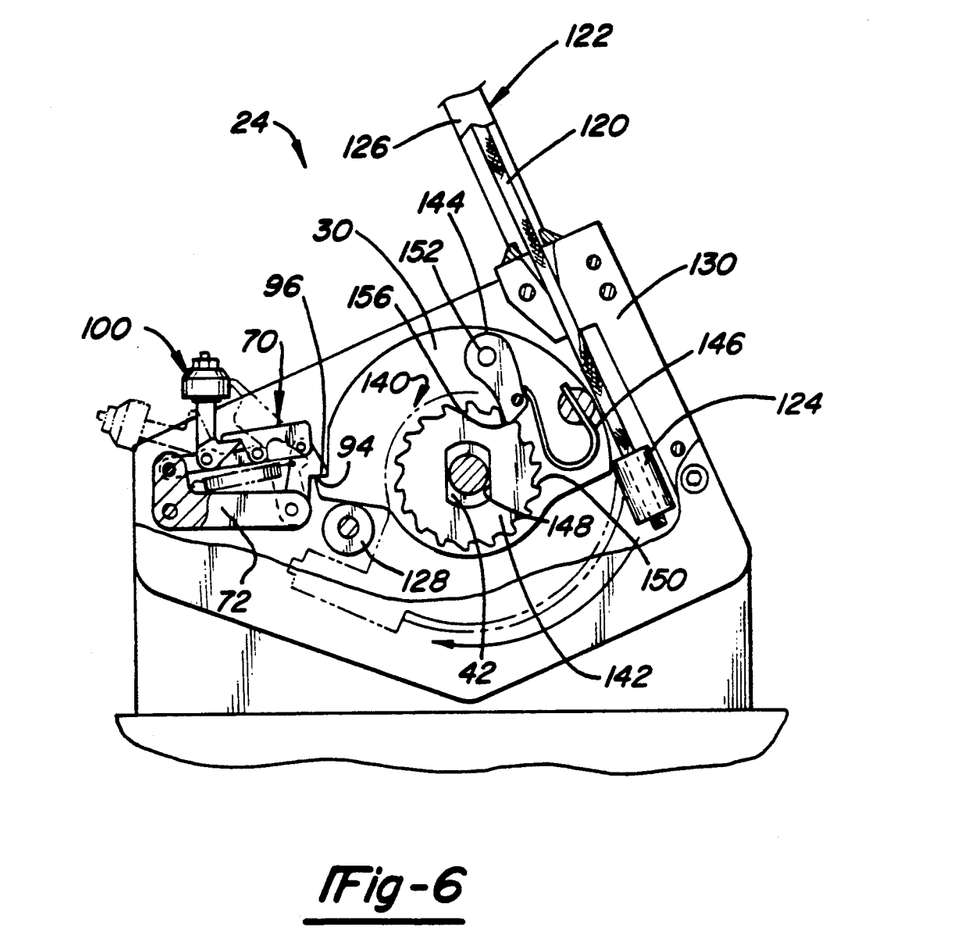
FIG. 6 is an end view of the belt tensioning mechanism.

As best seen from FIGS. 2 and 5, a rigid base member 72 is fixedly retained between side plates 40A and 40B and is provided to operably support over-center toggle linkage 70. Over-center toggle linkage 70 is a spring biased three-bar linkage having a first link 74, a second link 76, a release link 78, and a biasing spring 80. Base 72 is fabricated as a generally L-shaped member having an upstanding portion defining a pair of laterally spaced flanges 82. A first end of first link 74 is mounted between laterally spaced flanges 82 for pivotable movement about pivot pin 84. Likewise, a second end of first link 74 is coupled to a first end of second link 76 for pivotable movement about pivot pin 86. The opposite end of second link 76 is coupled to an upper portion of release latch 78 for pivotable movement about pivot pin 88. Finally, the lower end of release latch 78 is coupled for pivotable movement between a pair of laterally spaced flanges 90 formed at the terminal end of the horizontally extending portion of L-shaped base member 72. More particularly, the lower end of release latch 78 is retained between flanges 90 via a pivot pin 92. A first end of biasing spring 80 is secured to a intermediate portion of release latch 78 while its second end is secured to base member 72. Furthermore, release latch 78 includes a transversely extending shoulder 94 which is provided for releasable engagement with a ledge 96 formed on reel member 30.

As best seen in FIG. 5, inertia sensing means 26 comprises a pendulum-type inertia force sensor 100 that is pivotably retained on a central portion of first link 74 via pivot pin 102. More particularly, inertia force sensor 100 includes a wedge-shaped hinge bracket 104 pivotably supported via hinge pin 102 to first link 74. An elongated shaft 106 is rigidly fixed to hinge bracket 104 and is adapted to support a inertial weighted member 108 thereon. Hinge bracket 104 has a pair of downturned flanges which straddle the central portion of first link 74 and through which pivot pin 102 extends. Hinge bracket 104 includes a rearwardly extending projection 110 defining a planar surface 112 that is adapted to coact with a planar underside surface 114 on a forwardly extending projection 116 formed on second link 76. In addition, axis 118 of inertia force sensor 100 is normally maintained in a slightly "over-center" position with respect to vertical axis 119. In operation, inertia force sensor 100 acts as a weighted pendulum for causing shaft 106 to rotate forward (i.e., clockwise in FIG. 5) when an inertial force exceeding the predetermined critical level (i.e., about 7 g's deceleration) is applied to the vehicle. The over-center positioning of inertia force sensor 100 as well as the mass of weight 108 are selected to determine the critical value at which toggle linkage 70 will be tripped.

In accordance with the preferred construction, reel member 30 is a disk-like plate provided for retracting a predetermined length of an inner cable 120 of cable assembly 122 upon actuation of belt tensioning mechanism 24. A ferule 124 is secured at one end of inner cable 120 while a coupling member 125 is secured at its opposite end which is adapted for mounting belt buckle 22 thereto. Preferably, a protective sheath 126 encloses inner cable 120 to inhibit "kinking" during axial movement of inner cable 120 therein. A transversely extending stop pin 128 is secured between side plates 40A and 40B to limit over-rotation of reel member 30 once it has been released. A cable guide 130 is provided for routing inner cable 120 onto reel member 30. Reel member 30 includes a channel-like groove 132 for receiving inner cable 120 once reel member 30 has been put in motion upon release of the pre-loaded rewind spring 44 via actuation of triggering linkage 70. A bracket 134 is firmly attached to reel member 30 for retaining inner cable 120 in groove 132 as well for providing a stop surface with which ferule 124 abuts when there is tension placed on belt buckle 22. As noted, reel member 30 is provided with ledge 98 for maintaining contact with shoulder 96 on release latch 76 prior to release of rewind spring 44.

Figure 4:
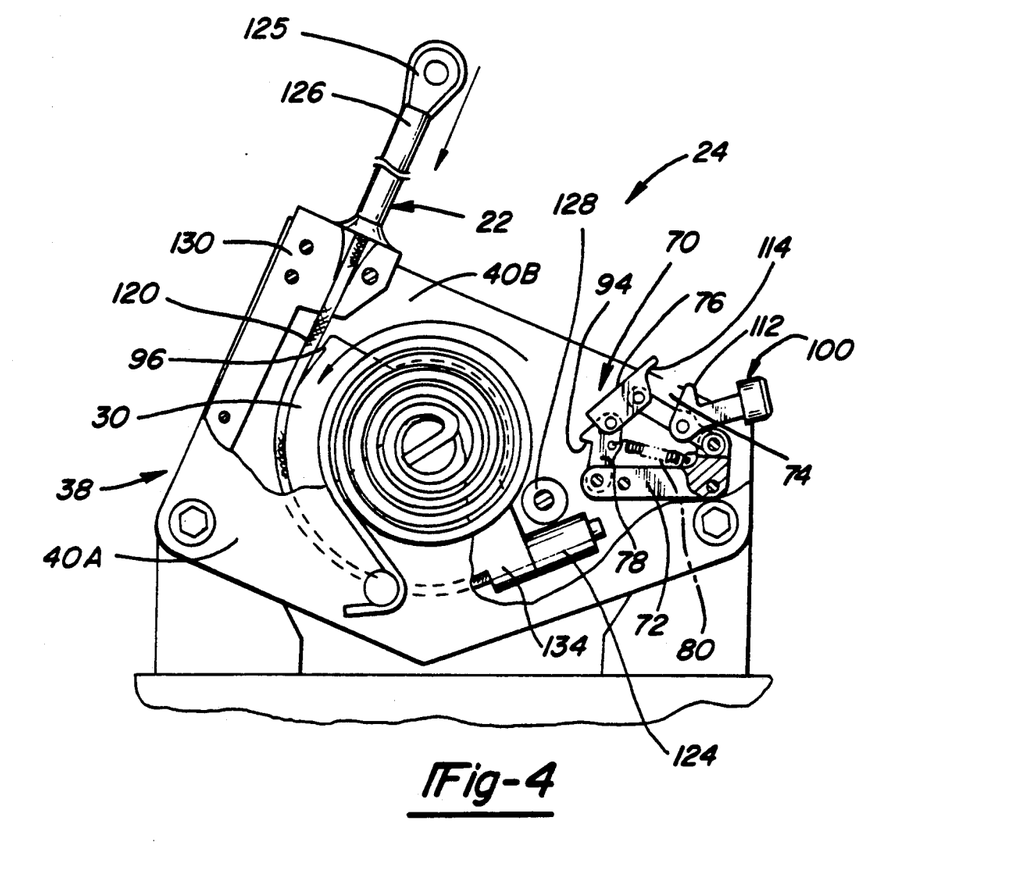
FIG. 4 is a partially cut-away side view illustrating the belt tensioning mechanism in an "actuated" position.

With particular reference now to FIGS. 3 through 5, toggle linkage 70 is shown to be movable between a first or "under-center" position for retaining reel member 30 in its "locked" position in opposition to rewind spring 44, and a second or "over-center" position wherein reel member 30 is released. A unique feature of the present invention is that toggle linkage 70 is operable to controllably retain the relatively large pre-loaded force exerted by rewind spring 44 on release latch 78 yet may be easily triggered upon sufficient pivotable movement of inertia force sensor 100. As will be appreciated, once toggle linkage 70 has been tripped, the pre-loaded biasing force of rewind spring 44 acts to drivingly rotate reel member 30 (counterclockwise in FIG. 4) for winding inner cable 120 thereon which, in turn, causes belt buckle 22 to be rearwardly retracted from the normal position shown in FIG. 1. If seat belt 14 is tightly fastened against the seat occupant prior to tripping of toggle linkage 70, belt tensioning mechanism 24 is operable to retract belt buckle 22 until a relatively large "tensioning" load is exerted on the seat occupant's body which effectively couples the seat occupant to seat 10.

In order to assure that tension will be maintained on the seat occupant once belt tensioning mechanism 24 has been actuated and has preformed its tightening function, locking means 36 acts to maintain reel member 30, inner cable 120 and buckle member 22 in their respective retracted position, thereby inhibiting subsequent withdrawal of buckle member 22. Preferably, locking means 36 is a ratchet mechanism 140 having a toothed ratchet disk 142, a locking pawl 144 and a biasing spring 146. Ratchet disk 142 is secured for rotation to drive rod 42 via a rectangular aperture 148 that is sized to receive rectangular central portion 52 therein. Ratchet disk 142 has a continuous set of teeth 150 formed about its perimeter. Pawl 144 is pivotably coupled to an inside surface of side plate member 40B via pivot pin 152. In addition, pawl 144 includes an outwardly extending lever which projects through a slot 154 located in side plate 40B and which functions to limit the range of pivotable movement of pawl 144 about pivot pin 152.

The biasing force of biasing spring 146 continuously acts on pawl 144 for causing a locking tip 156 formed on pawl 144 to ratchet over and maintain engagement with teeth 150 upon ratchet disk 142 being rotatably driven in response to release of reel member 30 via actuation of toggle linkage 70. Biasing spring 146 maintains a substantial amount of force, for example one hundred and eighty pounds, on pawl locking tip 156, thereby keeping pawl 144 firmly engaged with ratchet teeth 150. As such, rachet mechanism 140 acts as a one-way locking mechanism for allowing rotation of reel member in the driven direction while inhibiting subsequent rotation in the opposite direction due to locked engagement of pawl locking tip 156 with ratchet teeth 150. The seat occupant can thereafter free himself from seat belt 14 by releasing latch plate 20 from belt buckle 22 in a conventional manner.

Operation of belt tensioning mechanism 24 will now be described. In FIGS. 3 and 5, inertia force sensor 100 and over-center toggle linkage 70 are oriented such that belt-tensioning mechanism 24 is in the pre-loaded "non-actuated" condition. In such a position, pivot point 86 between first link 74 and second link 76 is maintained in a "detented" position slightly below pivot point 88 between release latch 78 and second link 76. Moreover, pivot point 86 is shown to be maintained at a position below an imaginary line 160 drawn between pivot point 88 and pivot point 84. Biasing spring 80 is provided for normally biasing release latch 78 in a direction toward upstanding portion 82 of base member 72 such that biasing spring 80 functions to assist in maintaining the normal "under-center" position of pivot point 86. Moreover, in the "under-center" position, surface 112 of hinge bracket projection 110 is in relatively flush mating engagement with surface 114 formed on second link projection 116. As such, shoulder 96 formed on release latch 78 can retain several hundred pounds of pre-loaded force ("F") exerted by rewind spring 44 on drive rod 42 and, in turn, on reel member 30. However, triggering linkage mechanism 70 may be actuated (i.e., axis 118 of inertia force sensor 100 go "over-center" relative to vertical axis 119) with only a few pounds of force upon detection of the deceleration force.

With reference to FIG. 4, belt tensioning mechanism 24 is shown in its "actuated" condition following tripping of toggle linkage 70 in response to detection of the deceleration force. More particularly, in response to the vehicle being subjected to a deceleration force exceeding the critical value, inertia for sensor 100 is caused to pivot about pivot point 102. Weight 108 is sufficiently large such that forward rotation of inertia force sensor 100 causes axis 118 to pass vertical axis 119. Inertia force sensor 100 is constructed and arranged such that upon passing vertical axis 119 continued forward rotation occurs, thereby causing hinge bracket projection 110 to upwardly pivot second link 76 such that pivot point 86 passes "over-center" of imaginary line 160. Thereafter, the biasing force of biasing spring 60 acts to urge release latch 78 to pivot in a counterclockwise direction about pivot 92. Once triggered, the pre-loaded biasing force of rewind spring 44 is released for causing drive rod 42 to be immediately rotated in a counterclockwise direction to the position shown in FIG. 4. In this manner, a predetermined length of inner cable 120 is automatically wound onto reel member 30 which causes belt buckle 22 to be displaced or "retracted" toward belt tensioning mechanism 24.

Retraction of inner cable 120 through a channel formed of cable guide 130 results in inner cable 120 being wrapped on reel member 30 as it rotates about drive rod 42. Inner cable 120 continues to wrap around reel member 30 until either bracket 134 contacts stop pin 128, or until seat belt 14 has become sufficiently "taut" against the seat occupant's body such that the biasing force of rewind spring 44 is overcome. When belt tensioning mechanism 24 has achieved either of these two conditions, spring 146 urges pawl locking tip 156 into locked engagement with ratchet teeth 150 on ratchet disk 142 to prevent subsequent withdrawal of inner cable 120. In a preferred construction, belt tensioning mechanism 24 is capable of retracting belt buckle 22 about four inches.

The preceding chain of events of sensing the deceleration, actuating the pre-loaded drive mechanism, retracting belt buckle 22, and then locking tensioning mechanism 24, all occur in a period of less than approximately 15 milliseconds after detection of the excessive deceleration force. From testing, it is known that a seat occupant's body does not leave the seat back until approximately 25 to 30 milliseconds following being subjected to the deceleration force. By reacting so quickly, belt tensioning mechanism 24 of the present invention is capable of effectively tightening seat belt 14 before an inertial load (i.e., the seat belt occupant's body) is applied to the belt webbing. Therefore, the present invention acts to minimize forward excursions of the occupant's body into rigid on-board structures.

In accordance with another feature of the present invention, belt tensioning mechanism 24 is provided with an anti-tripping feature which prevents the device from being prematurely triggered during shipping and installation into the vehicle. Preferably, a lock pin (not shown) passes through a pair of aligned apertures formed within the laterally spaced side plates 40A, 40B to permit the lock pin to extend over the top of second link 76 so as to inhibit actuation thereof. The lock pin can be easily removed following completion of installation into the vehicle.

While a specific embodiment has been shown and described in detail to illustrate the principles of the present invention, it will be understood that the present invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A belt tensioning mechanism of the type used in motor vehicles to retract a seat belt buckle for applying a tensioning load on a seat belt in response to a deceleration exceeding a predetermined critical value, said mechanism comprising:
   inertia sensing means for sensing the magnitude of a deceleration;
   a reel member;
   coupling means for coupling said seat belt buckle to said reel member;
   drive means for rotatably driving said reel member from a locked position toward a released position;
   linkage means movable between a first position for normally retaining said reel member in said locked position and a second position for releasing said drive means;
   actuation means for moving said linkage means from said first position to said second position in response to said inertia sensing means detecting a vehicle deceleration exceeding said predetermined critical value, movement of said linkage means to said second position causing said drive means to rotatably drive said reel member for winding said coupling means on said reel member such that said seat belt buckle is moved to a retracted position; and
   locking means for retaining said seat belt buckle in said retracted position.

2. The belt tensioning mechanism of claim 1 further comprising a housing that is secured to a structural portion of said vehicle, said inertia sensing means being movably supported from said housing for sensing decelerations exerted on said motor vehicle.

3. The belt tensioning mechanism of claim 2 wherein said linkage means is an over-center toggle linkage.

4. The belt tensioning mechanism of claim 3 wherein said drive means is a mechanical drive mechanism having a drive rod and a spring member, said reel member being fixed on said drive rod for rotation therewith, said spring member exerting a pre-loading biasing force on said drive rod when said toggle linkage mechanism is in said first position, said pre-loaded biasing force being released for rotatably driving said drive rod and said reel member in response to said toggle linkage mechanism being moved to said second position.

5. The belt tensioning mechanism of claim 4 wherein said spring member is a circular rewind spring.

6. The belt tensioning mechanism of claim 3 wherein said inertia sensing means is a pendulum-type inertia force sensor, and wherein said actuation means is a portion of said inertia force sensor acting on said over-center toggle linkage for moving said over-center toggle linkage from said first position to said second position in response to said inertia force sensor detecting said deceleration exceeding said predetermined critical value.

7. The belt tensioning mechanism of claim 6 wherein said over-center toggle linkage includes a release latch having a shoulder portion provided for lockingly engaging a complimentary ledge portion formed on said reel member for retaining said reel member in said locked position when said toggle linkage is in said first position.

8. The belt tensioning mechanism of claim 6 wherein said over-center toggle linkage further comprises:
 a base member secured to said housing;
 a first link having a first end coupled to said base member for pivotable movement about a first pivot;
 a second link having a first end coupled to a second end of said first link for pivotable movement about a second pivot, and a second end coupled to a first end of said release latch for pivotable movement about a third pivot;
 a second end of said release latch being pivotably coupled to said base; and
 biasing means for urging said release latch toward said base member, said over-center toggle linkage being located in said first position when said second pivot is below a line drawn between said first and third pivots.

9. The belt tensioning mechanism of claim 8 wherein said inertia force sensor is pivotably coupled to a central portion of said first link and has surface means acting on complimentary surface means formed on said second link, said surface means operable to act on said complimentary surface means for moving said over-center toggle linkage from said first position to said second position in response to pivotable displacement of said inertia force sensor upon said motor vehicle being subjected to said deceleration exceeding said predetermined value.

10. The belt tensioning mechanism of claim 6 wherein said locking means is a ratchet mechanism having a toothed rachet disk fixed for rotation with said drive rod, a pawl fixed to said housing for pivotable movement with respect to the teeth of said ratchet disk, and second biasing means for urging a locking end of said pawl into engagement with said ratchet teeth, said ratchet mechanism operable to permit rotation of said reel member upon release of said drive means while inhibiting subsequent rotation of said reel member in an opposite direction.

11. A belt tensioning mechanism for applying a tensioning load on a seat belt in response to a motor vehicle being subjected to a deceleration exceeding a predetermined critical value, said belt tensioning mechanism comprising:

a housing secured to a structural portion of said motor vehicle;
 an inertia force sensor supported for pivotable movement from said housing;
 a reel member;
 a seat belt buckle;
 a cable having a first end coupled to said seat belt buckle and a second end coupled to said reel member;
 a drive mechanism operable for rotatably driving said reel member from a locked position to a released position, said drive mechanism having a drive rod and a spring member with said reel member being fixed for rotation on said drive rod, said spring member exerting a pre-loaded biasing force on said drive rod;
 a toggle linkage movable between a first position for normally retaining said reel member in said locked position, and a second position for releasing said reel member such that said pre-loaded biasing force of said spring member is permitted to rotatably drive said reel member towards said release position;
 actuation means for moving said toggle linkage from said first position to said second position in response to said inertia force sensor detecting a vehicle deceleration exceeding said predetermined critical value, movement of said toggle linkage to said second position is operable to cause said pre-loaded biasing force of said spring member to rotatably drive said reel member in a first direction for winding said cable thereon such that said seat belt buckle is moved to a retracted position; and
 locking means for retaining said seat belt buckle in said retracted position for inhibiting rotation of said reel member in an opposite direction.

12. The belt tensioning mechanism of claim 11 wherein said spring member is a circular rewind spring having a first end secured to said drive rod and a second end secured to said housing, said rewind spring operable to exert said pre-loaded biasing force on said drive rod when said reel member is located in said locked position.

13. The belt tensioning mechanism of claim 11 wherein said inertia force sensor is a pendulum type device, and wherein said actuation means is a surface portion of said pendulum type inertia force sensor adapted to act on a complimentary surface portion of said toggle linkage for moving said toggle linkage from said first position to said second position in response to said deceleration force exceeding said predetermined critical value.

14. The belt tensioning mechanism of claim 13 wherein said toggle linkage includes a release latch member having a shoulder portion provided for lockingly engaging a complimentary ledge portion formed on said reel member for retaining said reel member in said locked position when said toggle linkage is in said first position.

15. The belt tensioning mechanism of claim 14 wherein said toggle linkage further comprises:
 a base member secured to said housing;
 a first link having a first end coupled to said base member for pivotable movement about a first pivot;
 a second link having a first end coupled to a second end of said first link for pivotable movement about a second pivot, and a second end coupled to a first end of said release latch for pivotable movement about a third pivot;

a second end of said release latch being pivotably coupled to said base; and biasing means for urging said release latch toward said base member, said toggle linkage being located in said first position when said second pivot is below a line drawn between said first and third pivots.

16. The belt tensioning mechanism of claim 15 wherein said inertia force sensor is pivotably coupled to a central portion of said first link and has surface means acting on complimentary surface means formed on said second link, said surface means operable to act on said complimentary surface means for moving said toggle linkage from said first position to said second position in response to said inertia force sensor being pivotably displaced upon said motor vehicle being subjected to said deceleration exceeding said predetermined value.

17. The belt tensioning mechanism of claim 16 wherein said locking means is a ratchet mechanism having a toothed rachet disk fixed for rotation with said drive rod, a pawl fixed to said housing for pivotable movement with respect to the teeth of said ratchet disk, and second biasing means for urging a locking end of said pawl into engagement with said ratchet teeth, said ratchet mechanism operable to permit rotation of said reel member upon release of said drive means while inhibiting subsequent rotation of said reel member in an opposite direction.

* * * * *